Sept. 26, 1967 C. R. TALMAGE 3,343,955
ART OF ATTACHING A BACK TO A BRAKE DRUM BY
BRAZING DURING A SINTERING OPERATION
Filed Feb. 3, 1964

INVENTOR.
CHARLES ROBERT TALMAGE
BY
Barnes, Kisselle, Raisch & Choate
ATTORNEYS

United States Patent Office 3,343,955
Patented Sept. 26, 1967

3,343,955
ART OF ATTACHING A BACK TO A BRAKE DRUM BY BRAZING DURING A SINTERING OPERATION
Charles Robert Talmage, New Canaan, Conn., assignor, by mesne assignments, to Motor Wheel Corporation, Akron, Ohio, a corporation of Ohio
Filed Feb. 3, 1964, Ser. No. 342,088
5 Claims. (Cl. 75—208)

This invention relates to a brake drum of the type having a sintered metal brake track and in particular to the method of attaching a back to such a drum.

This invention contemplates attaching a back to a brake drum of the type hereinabove referred to by a method that is economical and effective; and that produces a strong, neat-appearing attachment.

Figure 1:
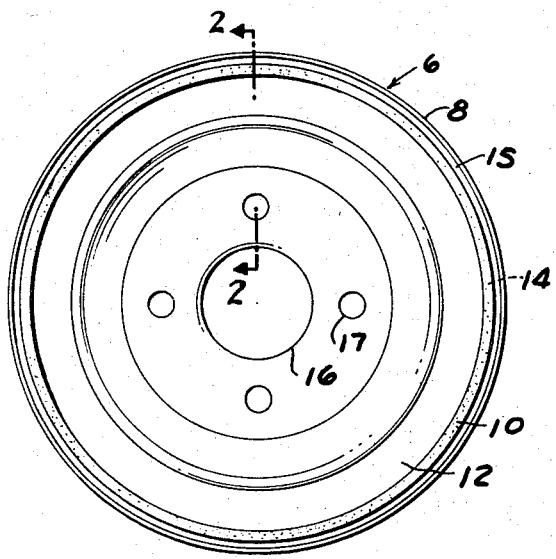
FIG. 1 shows a completely assembled brake drum with the back attached thereto, the drum having a sintered metal brake track.
Figure 2:
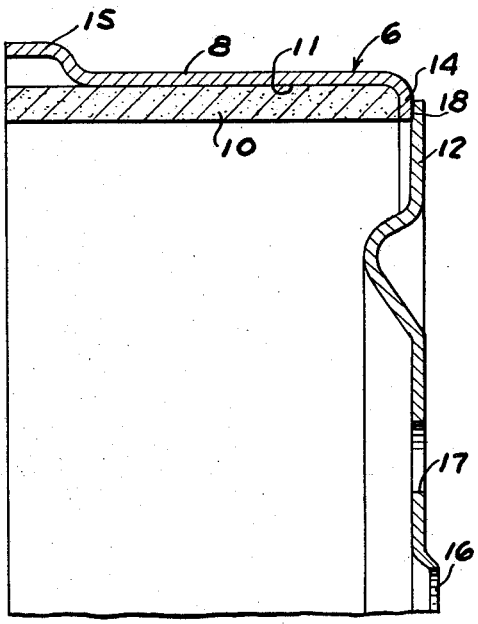
FIG. 2 is a fragmentary sectional view taken along line 2—2 of FIG. 1 to illustrate a brazed interface between the back and the drum.

FIGS. 1 and 2 show a finished brake drum 6 comprising a generally cylindrical steel shell 8, a brake track 10 that lines the inner cylindrical surface 11 of shell 8, and a drum back 12 which is attached to a radially inward extending flange 14 on shell 8. Shell 8 also has an outwardly flared portion 15 that forms a dust seal when drum 6 is assembled with other brake parts. Back 12 is provided with a central aperture 16 and bolt holes 17 for assembling drum 6 on other wheel parts. Brake track 10 is composed primarily of sintered metal and, preferably, has been infiltrated with copper which also brazes brake track 10 to shell 8.

In accordance with this invention, back 12 is brazed to flange 14 at interface 18 while brake track 10 is sintered.

Figure 3:
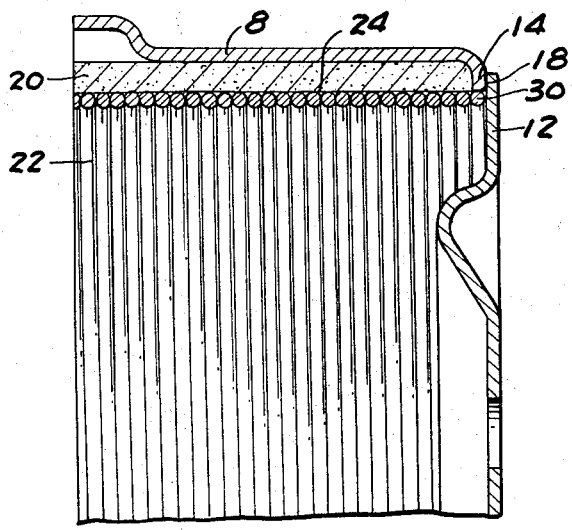
FIG. 3 is a fragmentary sectional view showing an intermediate brake drum and back assembly as it appears prior to a combined sintering and attaching operation.

In fabricating brake drum 6 a green compact sleeve 20 (FIG. 3) is assembled within shell 8. Sleeve 20 is composed of a ferrous metal blend, primarily iron powder together with graphite and a suitable lubricant. Sleeve 20 may be compacted directly in shell 8 or separately compacted and then assembled within shell 8. If sleeve 20 is to be infiltrated with copper during the sintering operation a coil 22 of copper wire is placed adjacent the inner cylindrical surface 24 of sleeve 20. In accordance with the instant invention, back 12 is positioned in contact with flange 14 before sleeve 20 is sintered, the interface 18 of back 12 and flange 14 being the juncture that is to be brazed. Preferably coil 22 is positioned so that an end convolution 30 is adjacent interface 18. Shell 8, sleeve 20 and back 12, along with coil 22, assembled as shown in FIG. 3, are heated to a temperature of approximately 2050° F. to sinter the iron powder in sleeve 20 and melt the copper in coil 22. While sleeve 20 is being sintered, the molten copper from coil 22 infiltrates sleeve 20, brazes the sleeve to shell 8, and brazes back 12 securely to shell 8 at interface 18. It is not necessary that end convolution 30 be positioned at interface 18. So long as copper in excess to that necessary to infiltrate sleeve 20 is supplied by any part of coil 22, the excess copper can braze back 12 to flange 14. Preferably bolt holes 17 and aperture 16 are formed to final dimensions after the sintering operation.

Figure 4:
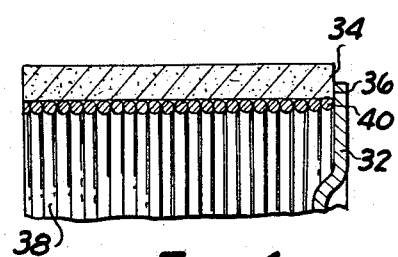
FIG. 4 is a fragmentary sectional view illustrating an alternative embodiment where the drum back is attached directly to the brake track during a combined sintering and attaching operation.

FIG. 4 illustrates an embodiment substantially identical to that shown in FIG. 3, except that shell 8 is eliminated and a drum back 32 is to be attached directly to a sleeve 34 at interface 36 during a sintering operation. As with the embodiment illustrated in FIG. 3, a coil 38 of copper wire is positioned within sleeve 34 so that an end convolution 40 is adjacent interface 36. During the sintering operation sleeve 34 is infiltrated with copper and back 32 is brazed to sleeve 34.

Although FIGS. 3 and 4 illustrate embodiments where the sleeve is to be infiltrated with copper, this invention also contemplates combining the attaching operation with the sintering operation without infiltrating the compact sleeve. Where infiltrating is not desired, copper is supplied only adjacent interfaces 18 (FIG. 3) or 36 (FIG. 4). However, if infiltration is desired, copper in excess of that required to infiltrate the voids in the sleeve is supplied. Conventional furnace brazing techniques can be utilized in attaching the back to the shell or the sleeve during the sintering operation. So long as copper in excess of that required to achieve the desired degree of infiltration, as for example anywhere from below 25 percent up to 100 percent, the excess copper will be available to braze back 12 to flange 14. Any suitable brazing material could be used so long as its melting temperature is within the sintering temperature range of the iron powder. For example, since copper has a melting temperature of about 1981° F. and the sintering temperature range for iron powder compacts generally is about 1500° F. to 2200° F., the particular sintering temperature used must exceed 1981° F. during the process. The preferred temperature is 2050° F. Arrangements other than the coil of copper wire could be used to supply brazing material adjacent the interface. For example, copper or copper alloy powders can be compacted in sleeve 20 or as a separate compact and then assembled with sleeve 20. Jigs or other devices may be provided to maintain the back and the shell or the sleeve in proper relationship after assembly as well as to supply pressure at the proposed juncture during the combined sintering and attaching operation. Preferably the mating portions of flange 14 and back 12 are provided with a piloting arrangement, as for example a shoulder on back 12, to position and maintain the parts in proper relationship during the combined sintering and attaching operation.

When a drum back is attached as hereinbefore described, a strong and neat-appearing joint results from uniform distribution of the brazing material. Little or no distortion of the back or drum occurs as is quite often present when attaching is by separate brazing or arc welding operations. Moreover, manufacturing costs are reduced by combining the attaching operation with the sintering operation.

I claim:
1. The method of attaching a brake drum back to a generally cylindrical brake drum at one end thereof wherein a partly finished brake drum includes a green compact comprising primarily ferrous metal powders that are to be sintered to form a wear material brake track in a finished brake drum, said back being made of a ferrous alloy and being adapted to assemble said drum on other wheel parts, comprising the steps of positioning said back in juxtaposition with said partly finished brake drum at said one end thereof to define a proposed juncture therebetween, and supplying to said juncture brazing material having a melting temperature within the sintering temperature range of said ferrous powders compact while heating said partly finished brake drum, said back and said brazing material to a temperature sufficient to sinter said ferrous powders compact and to secure said back to said drum at said one end thereof with a brazed joint.

2. The method set forth in claim 1 wherein said compact is assembled within a generally cylindrical brake drum shell having a radially inwardly extending flange at one end thereof and said back is positioned with an annular zone thereof contacting said flange to form said proposed juncture between said back and said flange so that said back is brazed to said flange.

3. The method set forth in claim 1 wherein said compact is a cylindrical sleeve having a radial face at one end thereof, said back is positioned with an annular zone thereof contacting said end face of said sleeve to form said proposed juncture between said back and said face so that said back is brazed to said sleeve at said one end thereof.

4. The method set forth in claim 1 where brazing material in excess of that required to braze said back to said drum is supplied to infiltrate said sintered compact during sintering thereof.

5. The method set forth in claim 4 wherein said brazing material is supplied to infiltrate said compact to braze said back to said drum by positioning a coil of copper wire within said track prior to sintering, said coil having convolutions adjacent said metal powder and said proposed juncture.

References Cited

UNITED STATES PATENTS

| | | | |
|---|---|---|---|
| 2,161,597 | 6/1939 | Swartz | 29—149.5 |
| 2,299,192 | 10/1942 | Tormyn | 29—149.5 |
| 2,377,882 | 6/1945 | Hensel et al. | 29—149.5 |
| 2,401,221 | 5/1946 | Bourne | 29—182.2 X |
| 2,577,187 | 12/1951 | Fox | 29—149.5 |
| 2,728,134 | 12/1955 | Haller | 29—149.5 |
| 2,739,375 | 3/1956 | Coxe. | |
| 3,113,647 | 12/1963 | Tuttle | 188—218 |
| 3,139,671 | 7/1964 | Herron et al. | 75—208 X |
| 3,145,101 | 8/1964 | Franssen | 75—208 X |
| 3,235,959 | 2/1966 | Bartoszak | 29—501 X |

BENJAMIN R. PADGETT, *Primary Examiner.*

JOHN F. CAMPBELL, *Examiner.*

P. M. COHEN, R. L. GRUDZIECKI,
*Assistant Examiners.*

UNITED STATES PATENT OFFICE
CERTIFICATE OF CORRECTION

Patent No. 3,343,955                                              September 26, 1967

Charles Robert Talmage

It is hereby certified that error appears in the above numbered patent requiring correction and that the said Letters Patent should read as corrected below.

Column 3, line 19, after "compact" insert -- and --.

Signed and sealed this 5th day of November 1968.

(SEAL)
Attest:

Edward M. Fletcher, Jr.                                     EDWARD J. BRENNER
Attesting Officer                                                Commissioner of Patents